Oct. 28, 1958  J. D. ASSELIN ET AL  2,858,236
METHOD OF COATING FIBROUS HARDBOARD PANELS
AND RESULTANT ARTICLE
Filed Aug. 31, 1954

INVENTOR
JOHN D. ASSELIN
RUSSEL M. HENDRICKSON
BY
ATTORNEY

2,858,236
Patented Oct. 28, 1958

2,858,236

METHOD OF COATING FIBROUS HARDBOARD PANELS AND RESULTANT ARTICLE

John D. Asselin and Russell M. Henrickson, St. Paul, Minn., assignors, by mesne assignments, to Whirlpool Corporation, a corporation of Delaware Application August 31, 1954, Serial No. 453,418

5 Claims. (Cl. 117—68)

This invention relates to an improvement in coating compositions and composite overlay hardboard material coated therewith. More particularly, the invention concerns improving the moisture resistance characteristic of refrigerator door panels which are subject to freezing temperatures and flexure.

The answer to the problem of obtaining a compressed overlay board door panel having a low moisture absorption value at low refrigeration temperature in combination with the ability to retain this value when flexed under humid conditions at such temperatures is not obtained by application of conventional coating materials to hardboard and as backings for hardboard overlays. The coating material must be able to form a continuous film that is pliable and water resistant, have good anti-blocking properties, be non-odorous and nonabsorbent, and withstand flexure in a frozen condition without cracking.

Accordingly, it is an object of this invention to improve the moisture resistant qualities of hardboards and backings for hardboard overlays.

Another object of this invention is to provide a coating composition for improving the flexure characteristic of hardboard panels at low refrigeration temperatures.

Another object of this invention is to provide hardboard and hardboard overlay structure with antiblocking waxy coatings which do not crack at 0° F. and may be stored over long periods without detrimental effects.

Further objects and advantages will be apparent from the attached drawings and the following disclosure of the composite coating material and its application to hardboard structures.

Figure 1:
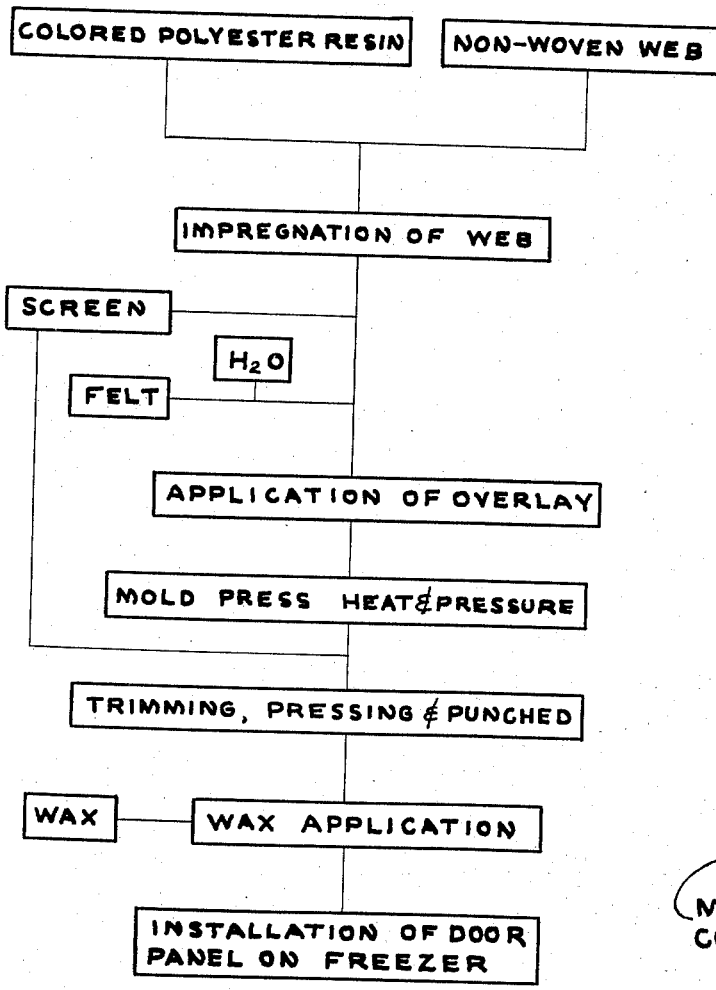
Figure 2:
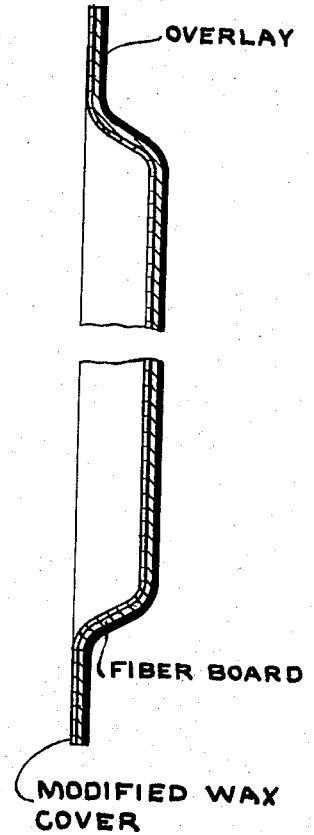
Figure 3:
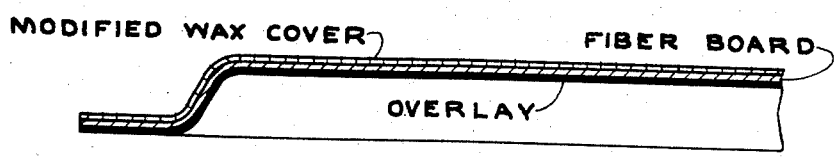

The attached drawings are illustrations wherein: Figure 1 shows a self-explanatory flow sheet of the method of forming an article, as herein described, and Figures 2 and 3 are self-descriptive articles illustrating structure exemplifying an application of the composition herein described to hardboard panels.

In preparing the wax composition and back coating for overlay hardboard, it will be recognized that a wax formulation which has good filming adherence to lignocellulose fiberboard and thereafter the coated fiberboard can be subjected to flexing at 0° F., without cracking, while affording moisture resistance, measured by weight increase in terms of from 1% to 5% after thirty days exposure to conditions of 100% relative humidity and 110° F., provides an unusually useful and novel result.

The new overlay fiberboard of the character as described in the copending application of Richard H. Goms, Serial No. 453,076, filed August 30, 1954, for Overlay Fiberboard and Method of Making the Same, is further improved by providing the board with a backside coating composition of the character herein described, and which is relatively permanent.

The compositions prepared and coated on the screen side of the board comprise paraffinic microcrystalline wax as a basic constituent having melting points of from 160° F. to 180° F., and a standard penetrometer reading of 14 to 18, mixed with one or more other ingredients giving a resultant penetrometer reading in the preferred range of from about six to about eighteen or alternatively a mixture of paraffinic microcrystalline waxes having a minimum and maximum range of from four to twenty. By standard penetrometer readings and the penetrometer readings as herein set forth is meant the values obtained under the standard method of testing as set forth in American Society for Testing Materials. Other necessary components or additions of the mixture are found to be, (1) a stearone product which is a synthetic wax material prepared as a symmetrical high molecular weight aliphatic ketone derived from stearic acid having the approximate composition of:

| | Percent |
|---|---|
| Stearic acid | 75 |
| Palmitic acid | 22 |
| Oleic acid | 3 | and composed largely of a straight chain hydrocarbon material as usually found in commercial stearic acid, as above indicated. The stearic acid and oleic acid of the commercial mixture are derived from fatty oils and have 18 carbon atoms in the fatty acid chains. The palmitic acid has 17 carbon atoms in the fatty chain. Such ketone compound as is derived from a commercial grade of stearic acid is known as "Stearone" and clearly described by the formula $(R)_2CO$ wherein R is a derivative of the long chain fatty radical, defined in "Organic Synthesis" vol. 33, page 84, and long known in the art. This publication including others, as Heintz, Jahresber Chem. 8,515—1855; Easterfield and Taylor, J. Chem. Soc., 99, 2298 (1911); Piper et al., Biochem. J., 25, 2074 (1931), and other publications, clearly show the manner of producing the "Stearone" derived compound of the principal component as the ketone illustrated by the general formula $(C_{17}H_{35})_2CO$. This formula $(R)_2CO$ with reference to "Stearone" and ketones derived from long chain fatty acids is well known to the man skilled in the art of fatty oil and fatty acid chemistry. (2) paraffin waxes having melting points of 136° F. to 140° F. with a penetrometer test of from ten to eighteen; (3) polyethylene wax having a molecular weight range of two thousand to five thousand and a penetrometer test of from 11–16, and (4) other microcrystalline waxes in the melting point range of from 160° F. to 180° F. having a penetrometer reading of from not under four or over twenty.

The preferred composition is a mixture of the following ingredients:

Example I

| | Percent |
|---|---|
| Paraffinic microcrystalline wax | 85 |
| Stearone (the aliphatic ketone above described) | 15 |

This mixture is prepared by melting the wax and prepared aliphatic ketone, mixing and stiring. This mixture is applied either by dipping a composite wood fiber hardboard in the melted solution, brushing or by hot spray, and provides a continuous film having the most desirable properties with a resultant penetrometer reading of approximately thirteen. The principal ketone component may be illustrated by the general formula $(C_{17}H_{35})_2CO$.

Additional illustrative coating compositions of the character herein described are provided by formulating melted mixtures of the above described ingredients as follows:

Example II

| | Percent |
|---|---|
| Paraffinic microcrystalline wax | 70 to 85 |
| Paraffinic waxes (M. P. 136° F.–140° F.) | 15 to 30 | and when coated in the melted form on the indicated overlay fiberboard gives a resultant penetrometer reading of from ten to eighteen.

Example III

| | Percent |
|---|---|
| Paraffinic microcrystalline wax | 95 to 97.5 |
| Polyethylene wax (M. W. 2000–5000) | 2.5 to 5.0 | and when coated, as heretofore indicated, give a resultant pentetrometer reading of from eleven to sixteen.

Example IV

| | |
|---|---|
| Paraffinic microcystalline wax (M. P. 160° F.–180° F.) (paraffinic) | 50% (penetrometer reading 4). |
| Other microcystalline wax (M. P. 160° F.–180° F.) | 50% (penetrometer reading 20). |

The other microcrystalline waxes are preferably selected from the group which produce a resultant penetrometer reading of eight. For the initial materials the minimum penetrometer reading is to be not less than four as the resultant material is too hard and not more than twenty as the resultant material is too soft when the basic paraffinic microcrystalline mixture is used as a coating on the materials and in the manner as herein described.

In general, as has been described, the wax coating compositions herein contemplated are prepared as melted mixtures and applied by merely heating above the respective melting point of the combined ingredients and then coated, preferably by brush or roller coating onto the backside of a lignocellulose hardboard which is a felted wood fiber, wax and resin composition having a resin impregnated sheet or adhesive sheet as a surface overlay simultaneously compressed therewith to form a molded board structure of low heat conductivity. The side of the board not provided with the overlay is called the screen side to which the paraffinic microcrystalline wax compositions as herein described are applied preferably in thickness of from five to ten mils.

Other hard fiberboard materials when coated with the herein described compositions are found to be improved in the following respects:

(1) Excellent resistance to moisture (1–5% weight increase) after 30 day exposure to conditions of 100% R. H. and 110° F.

(2) Good flexibility at temperatures as low as 0° F.

(3) Tasteless and odorless.

(4) Provide a nontacky surface even at temperatures as high as 120° F.

(5) Softening paint above 160° F.

(6) Provide excellent adhesion to wood fiber products.

(7) Attractive from an economic standpoint. For example, one pound of formulation surfaces approximately twelve square feet of hardboard at a cost of 0.7–1.2 cents per square foot.

Further, an average of test runs of lignocellulose hardboard coated with the above formulations disclosed that after twelve hours freezing the panels withstood the impact of sharp hammer blows with edges of the board placed on two supports. Also, the coated boards withstood bending flexure without cracking the coating.

A refrigerator door panel, for example, a lignocellulose felt of the character as herein described, is preferably provided on its exposed face with a resin or resin impregnated covering as an overlay sheet in a single pressing operation and the back or screen side is unfinished, as indicated. Heretofore, resinous or enamel type coatings have been used to seal this uncoated side of the panel and such coatings will not withstand the cold temperatures and flexing to which the panel may be subjected. Therefore, these coatings are a major cause of breakdown and inefficiency in refrigerator operation. A solution to this problem is provided by coating the screen side of the compressed overlay board with a paraffinic microcrystalline wax formulation as herein described. As indicated, the coating composition is applied in a melted condition and is brushed or roller coated on the unfinished side of the panel. To increase the board efficiency the coating is also applied over the board edges and may be applied over the overlay or exposed side of the panel board.

When coated with the composition described, a hardboard material may be stored indefinitely under conditions of relatively high or low temperatures and high humidity without becoming tacky (antiblocking). Further, the coated hardboard material does not change in its physical state and can withstand the bumping and handling to which it is subjected in shipping storage and manufacture. Thereby, the hardboard retains its insulation valve.

In accordance with the patent statutes, the principles of construction and operation of the improvement in refrigerator panels and fiber hardboards have been described and while it has been endeavored to set forth the best embodiment thereof, it is desired to have it understood that obvious changes may be made within the scope of the following claims without department from the spirit of the present invention.

We claim:

1. A hardboard panel material formed of compressed lignocellulose fiber coated with a wax composition comprising in combination a paraffinic microcrystalline wax having a melting point of 160° F. to 180° F. and a penetrometer reading of approximately 14 to 16 mixed with a symmetrical high molecular weight aliphatic ketone derived from a stearic acid mixture including stearic acid about 75%, palmitic acid about 22% and oleic acid about 3%, said coating having a resultant penetrometer reading of approximately 4 to 20 as determined by the standard method of testing of the American Society for Testing Materials and is flexible at freezing temperatures.

2. The method of coating a hardboard panel with a microcrystalline wax and waxy ketone additive to produce a structure which is flexible at freezing temperatures without cracking, affords moisture resistance measured by weight increase in terms of 1% to 5% after thirty days exposure to about 100% relative humidity and 110° F., comprising the steps of preparing a mixture of about 85% microcrystalline wax and about 15% waxy stearone additive, hot melting the mixture, spraying the mixture in the heated condition onto the hardboard until a coating is obtained in the approximate thickness of from about 5 to about 10 mils, having a softening point of above 160° F. and a penetrometer reading of from about 6 to about 18.

3. A refrigerator panel comprising in combination a compressed lignocellulose composition in sheet form having a resinous overlay coating on at least one side thereof and a wax coating composition thereon of about 5 mils to about 10 mils thickness coating at least on the side opposite said overlay coated side, said wax coating composition containing a paraffinic microcrystalline wax having a melting point of from 160° F. to about 180° F. and a waxy additive consisting essentially of a high molecular weight aliphatic ketones of the general formula $(R)_2CO$ where R is derived from a mixture of stearic acid, palmitic acid and oleic acid and producing in the combination a resultant penetrometer reading of from about 4 to 20, as determined by the standard method of testing of the American Society for Testing Materials, and the coating is flexible without cracking at freezing temperature.

4. A hardboard panel capable of use in refrigerator construction coated with a tasteless and odorless wax composition containing in combination a paraffinic microcrystalline wax and a high molecular weight aliphatic ketone derived from a commercial stearic acid, whereby the panel is provided with a coating which is non-tacky at temperatures as high as 120° F., has flexibility at freezing temperatures, a melting point of not less than about 160° F., and a resultant penetrometer reading of from about 4 to 20 as determined by the values obtained under the standard method of testing as set forth in American Society for Testing Materials.

5. A hardboard panel provided with a coating composition containing approximately 85% paraffinic microcrystalline wax and approximately 15% high molecular weight ketone material derived from a commercial stearic acid composition containing palmitic acid and oleic acid.

References Cited in the file of this patent

UNITED STATES PATENTS

| | | |
|---|---|---|
| 2,070,330 | Chase | Feb. 9, 1937 |
| 2,348,687 | Abrams | May 9, 1937 |
| 2,599,130 | Rumberger | June 3, 1952 |
| 2,642,366 | Rumberger | June 16, 1953 |